United States Patent

[11] 3,592,543

| [72] | Inventors | Horst Bickl<br>Munich;<br>Josef Pfeifer, Unterhaching, both of, Germany |
|---|---|---|
| [21] | Appl. No. | 777,034 |
| [22] | Filed | Nov. 19, 1968 |
| [45] | Patented | July 13, 1971 |
| [73] | Assignee | AGFA-Geraert Aktiengesellschaft<br>Leverkusen, Germany |
| [32] | Priority | Nov. 30, 1967 |
| [33] | | Germany |
| [31] | | A 57,545 |

[54] DEVICE FOR MAKING MICROFILM PHOTOGRAPHS
4 Claims, 4 Drawing Figs.

[52] U.S. Cl. ............................................. 355/67, 355/70
[51] Int. Cl. .................................................. G03b 27/56
[50] Field of Search ................................. 355/39, 67, 70

[56] References Cited
UNITED STATES PATENTS
| 2,596,376 | 5/1952 | De Goeij | 355/70 X |
| 2,629,813 | 2/1953 | Murphy | 355/70 X |
| 3,375,752 | 4/1968 | Fairbanks et al. | 355/70 |

Primary Examiner—Samuel S. Matthews
Assistant Examiner—Richard A. Wintercorn
Attorney—Arthur O. Klein ABSTRACT: A device for making microfilm photographs, and in particular an illuminating assembly for the device. The device includes a support which has a supporting surface on which the item to be photographed is located. A camera stand situates a camera over this surface, and the illuminating assembly is located in its entirety to one side of this surface, so that where the surface is rectangular, for example, it is freely accessible at its other three sides. The illuminating assembly is composed of two rows of lamp means for respectively providing light beams the intensity of which is controlled to a great degree by the angle of emission of the light beams. An adjusting means coacts with the rows of lamp means for directing the axes of the beams issuing from one row of the lamp means to that edge of the photographed item which is nearest to the one row, while the other row of lamp means is adjusted so that the axes of the beams issuing therefrom extend along the opposed edge of the item. In addition, the adjusting means is capable of adjusting the distance between the rows of lamp means and the supporting surface.

INVENTORS:
HORST BICKL
JOSEF PFEIFER

BY: Arthur O. Klein
THEIR ATTORNEY

DEVICE FOR MAKING MICROFILM PHOTOGRAPHS

BACKGROUND OF THE INVENTION

The present invention relates to devices for making microfilm photographs.

In particular, the present invention relates to that type of microfilm-photographing device where a camera stand supports a camera over the surface which supports the item to be photographed and where the surface which carries the item to be photographed also carries an illuminating assembly for illuminating the item which is photographed.

With know microfilm-photographing devices of this general type, the lighting of the item which is photographed is provided as a rule from two sides of the item so as to achieve in this way a lighting of the item which is as uniform as possible. For this purpose, it is in general conventional to use relatively bulky light boxes capable of emitting a light which is as diffuse as possible. Such light boxes, however, have overall dimensions which undesirably increase the magnitude of the entire device, and because these light boxes require supports to be situated at both of the smaller ends of the supporting surface, the operations which are required to be carried out at the device are hindered to an undesirably large extent.

With a light source which emits diffuse light, which is to say a light source of primarily spherical form, the characteristic of the intensity of the light beam is for the most part independent of the emission angle, so that it is only possible with considerable difficulty to provide at the surface which supports the item to be photographed a profile if light density which is required to achieve a uniform negative density in such a way as to compensate for the natural falling off of light at the edge regions of every imagining structure. It is required that the variation in the density of a negative which is suitable for further operations should not vary by more than plus or minus 0.05 density units.

SUMMARY OF THE INVENTION

It is accordingly a primary object of the present invention to provide a device which will avoid the above drawbacks.

In particular, it is an object of the invention to provide a device which will render the surface which supports the item to be photographed freely accessible from at least three sides, where this surface is of a rectangular configuration, for example.

It is also an object of the present invention to provide an illuminating assembly capable of giving at the supporting surface for the item to be photographed a light output which is higher for a given lamp power than can be obtained with conventional arrangements using comparable lamp powers.

It is also an object of the present invention to provide an illuminating assembly capable of locating the light of greatest intensity at those regions of the item to be photographed where the vignetting of the objective provides a natural fall off in brightness at the edge of the imaging system, so that in this way the regions where light intensity naturally diminishes will receive the greatest light intensity to achieve the required uniformity in the density of the negative. The illuminating means which can achieve this latter result directs light to the item only from one side, so that the remaining sides of the device are freely accessible and at the same time the dimensions of the entire device are not undesirably large.

Thus, it is a further object of the invention a device capable of being made of relatively small dimensions.

Also, it is an object of the invention to provide a device of this general type which is not only of a simple, inexpensive, rugged construction, but which in addition can be very easily manipulated to bring about required adjustment.

In accordance with the invention, a pair of rows of lamp means are situated at only one side of the surface which supports the item to be photographed, these lamp means respectively emitting light beams the intensity of which strongly depends upon the angle of light beam emission. An adjusting means coacts with the rows of lamp means for situating the axes of the beams issuing from one row along an end edge of the item to be photographed which is nearest to this one row while the axes of the beams issuing from the other row are directed along the opposed edge of the item which is photographed, the adjusting means also being capable of adjusting the plurality of lamp means with respect to their distance from the surface which supports the item to be photographed.

With a light source having a characteristic of substantially spherical configuration, the localized intensity of illumination, is primarily dependent upon only the square of the distance of the illuminated item from the light source and upon the cosine of the angle along which the light beams travels. Furthermore, it is in general only possible to provide desired changes in the value $r^2$. With a light source which has an intensity of light distribution depending strongly upon the angle of light emission, the localized light intensity will, on the contrary, vary in addition strongly according to a factor $K$ which is determined by the angular relationship between the position of the surface which is illuminated and the axis of the light beam. This localized light intensity $E$ can be calculated by the formula:

$$E = \frac{K \cdot I_0}{r^2} \cos \rho$$

The different light intensities at the location of the item which is to be photographed are achieved in this case by the pair of variables $K$ and $1/r^2$.

With lamps of suitable light distribution, as conventionally used, for example, for normal illumination of show windows, where there is point illumination surrounded by a reflector, it becomes possible by constantly changing $K/r^2$ to adapt the localized intensity of light so as to achieve the desired profile of light density. This adjustment goes forward without any loss of brightness by partial weakening of light or the like. As a result of the concentration of the light beam into a bundle of light occupying only an extremely narrow angle, it becomes possible to achieve a high output of light on the surface for the item to be photographed with a given lamp power which ordinarily would not provide such a high light output.

Moreover, the falloff in brightness of conventional lamps corresponds, with a light beam intensity which depends strongly upon the angle of light emission, for the most part to the natural falloff of brightness at the edges of an imaging system, this falloff resulting from vignetting of the objective. If, however, in accordance with the invention a pair of rows of lamp means are provided an adjusting means adjusting the rows 50 that the axes of the light beams issuing from one row of lamp means are distributed along a limiting edge of the item to be photographed which is nearest to this one row while the axes of the beams issuing from the other row are distributed along an opposed edge of the item to be photographed, so that the most intense light from the lamps coincides at the item to be photographed with those regions where edge falloff of light is greatest in the imaging system, it becomes possible to achieve uniform identity of negatives with the required profile of light density distribution without any further adjustments with a single illuminating assembly situated in its entirety at one side of the item which is photographed. Thus, the surface which supports the item to be photographed remains, where this surface is rectangular, for example, freely accessible at its other three sides, and the dimensions of the entire device are very favorably influenced.

In accordance witH further features of the invention, a camera stand which is situated at the side where the illuminating assembly is located can be formed as a unitary structure with the lamp stand, and the lamp stand can be provided with lamp carriers adjustable in elevation and carrying the rows of lamp means, with the adjusting means not only providing the elevational adjustment but also making it possible to adjust the several lamp means angularly and laterally.

According to a preferred embodiment of the invention, the several lamp means are releasably clamped to carrier bars of circular cross section each of and these bars are provided with a sleeve through which an upright of the lamp stand extends, this upright having a noncircular cross section.

BRIEF DESCRIPTION OF DRAWINGS

The invention is illustrated by way of example in the accompanying drawings which form part of this application, and in which.

DESCRIPTION OF A PREFERRED EMBODIMENT

Figure 1:
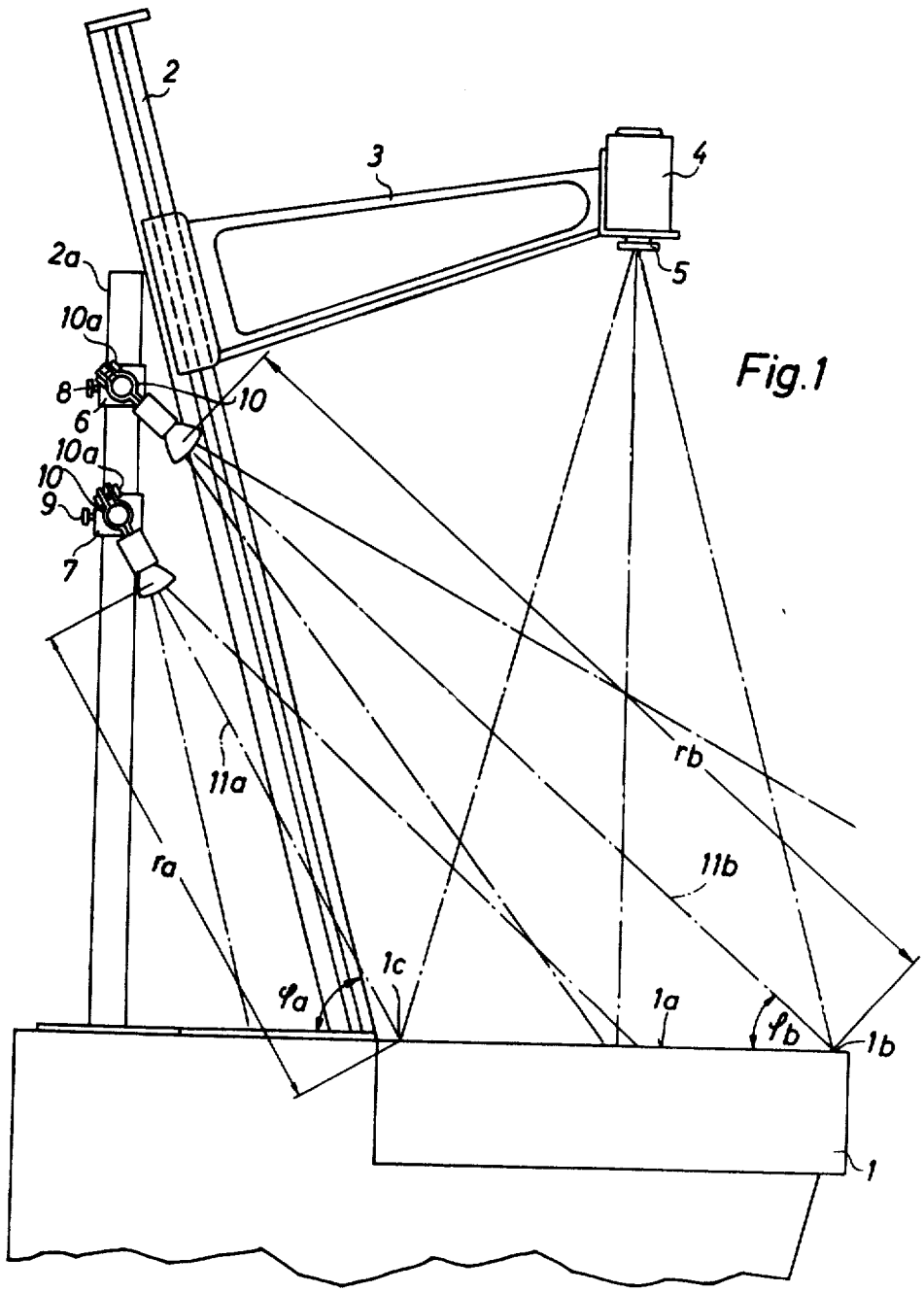
FIG. 1 is a fragmentary schematic side view of a microfilm-photographing device of the invention.
Figure 2:
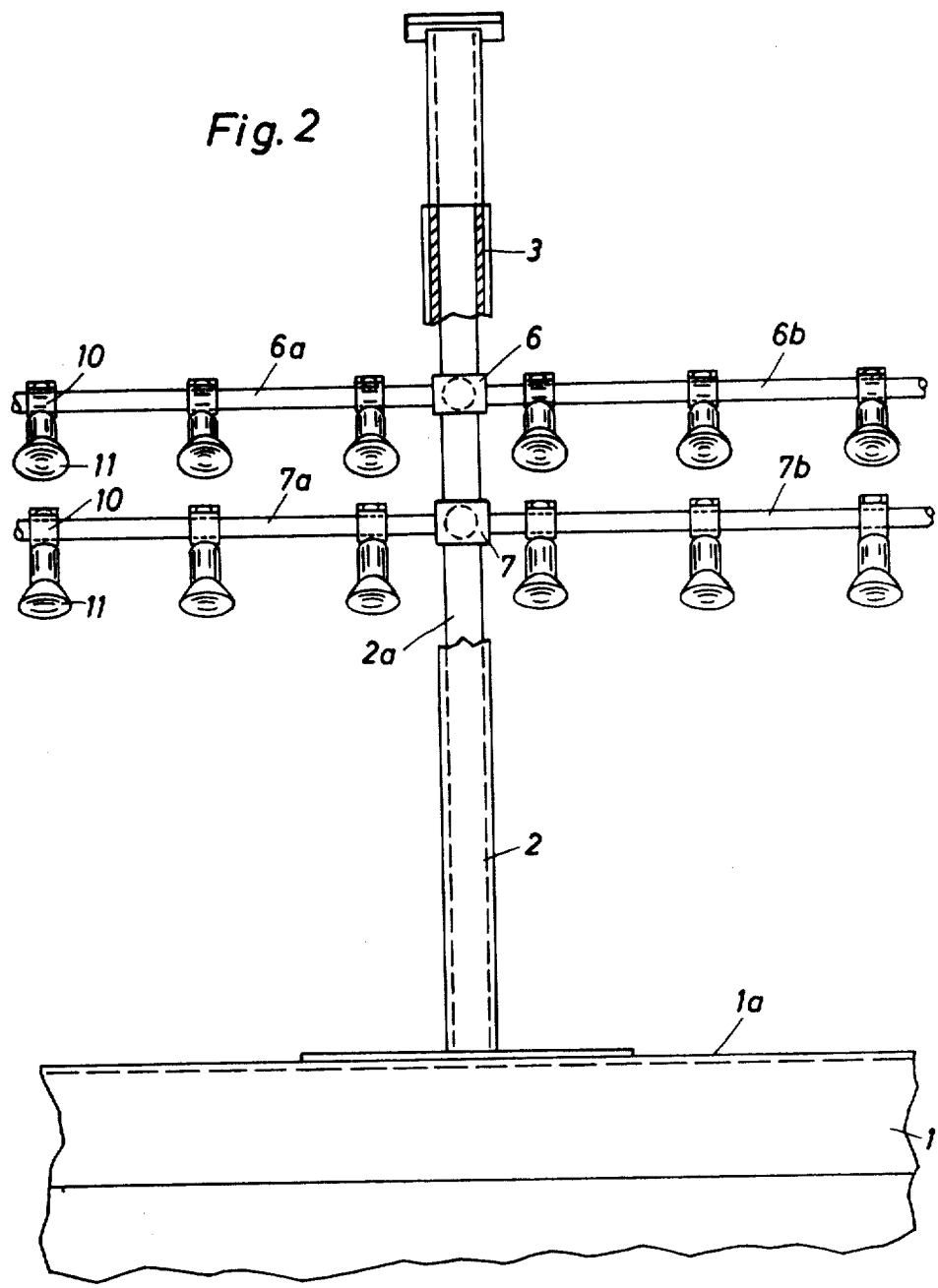
FIG. 2 is a fragmentary schematic front view showing particularly the illuminating assembly.

Referring now to FIGS. 1 and 2, the device illustrated therein includes a support 1 having an upper surface 1a on which the item to be photographed, such as a suitable sheet or the like is placed. The support 1 also carries at its upper surface 1a a camera stand 2 provided with a carrier arm 3 which supports, at its end distant from the upright of the stand 2, a camera 4 for making microfilm photographs and having the picture-taking objective 5. The camera stand 2 has its upright extending angularly with respect to the supporting surface 1a at an angle equal to one-half the imaging angle of the objective 5, so that in this way during adjustment of the elevation of the camera 4, it is not required to change the position of the line 1b, normal to the plane of FIG. 1, and coinciding with the front edge of the item which is photographed.

The upright of the camera stand 2 is fixed to and extends upwardly from a base plate to which an upright 2a is also fixed, this upright 2a being of a noncircular cross section and forming part of a lamp stand which includes horizontal bars 6a, 6b, 7a, 7b, all of which are of circular cross section with the bars 6a and 6b being coaxial and extending in opposite directions from a sleeve 6 through which the upright 2a extends and with the bars 7a and 7b also being coaxial and extending in opposite directions from a sleeve 7 through which the upright 2a also extends. These sleeves 6 and 7 form part of an adjusting means for adjusting the elevation of the carriers formed by the bars 6a, 6b, and 7a, 7b, and clamping screws 8 and 9, for example, can be manipulated by the operator for releasably clamping the sleeves 6 and 7 at selected elevations along the upright 2a. The adjusting means is also capable of adjustably positioning, on the carrier bars, the plurality of lamp means 11 which form a pair of rows of lamp means, as is particularly apparent from FIGS. 1 and 2. For this purpose the adjusting means includes springy clamping the shells 10 gripping the bars which are of circular cross section and carrying the lamp means, screws 10a being manipulated for releasably clamping the shells 10 on the bars 6a, 6b, and 7a, 7b not only at selected angular positions, but also at selected axial positions along these bars.

The plurality of lamp means 11 are in the form of lamps providing substantially point light sources. The several lamp means 11, may, for example, take the form of lamps as conventionally used for show window illumination. With such lamps the lamp filament is advantageously surrounded by a parabolic reflector which provides a concentrated bundle of light from the lamp filament to give to the lamp means a characteristic of beam distribution which depends to a very large extent on the angle of light beam emission. The individual lamp means, because of the manner in which they are supported by the adjusting means on the carriers 6a, 6b and 7a, 7b, can be laterally adjusted, longitudinally along these carrier bars, as well as angularly tilted about the axes of the carrier bars and then releasably clamped in their adjusted positions. In their initial positions, the rows of lamp means are adjusted so that the axes 11a of the light beams issuing from the lower row of lamp means extend along a line 1c coinciding with that edge of the item to be photographed which is nearest to the lower row of lamp means, and thus, nearest to the camera stand 2, while the axes 11b of the beams issuing from the upper row of lamp means are distributed along the line 1b which coincides with that end or edge of the item to be photographed which is opposed to the line 1c and which is situated at the greater distance from the camera stand 2.

Figure 3:
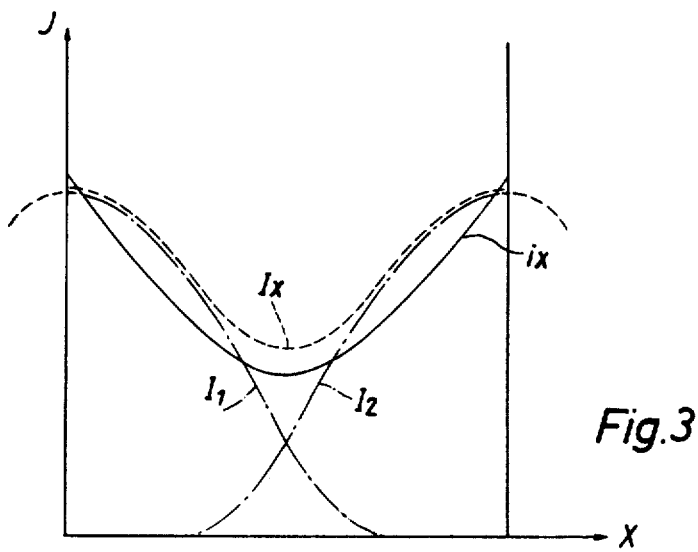
FIG. 3 is a graphic illustration of the transverse light distribution at the item to be photographed.
Figure 4:
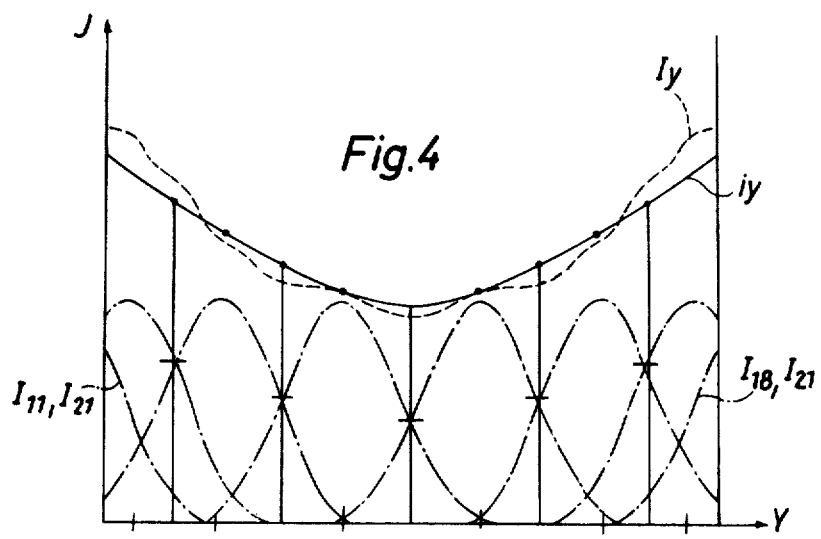
FIG. 4 is a graphic illustration of the longitudinal light distribution along the item which is photographed.

The several lamp means are adjusted in the manner indicated graphically in FIGS. 3 and 4. FIG. 3 is a diagrammatic illustration of the distribution of light intensity $i$ in the transverse direction $x$, the ordinate being in light intensity units J. FIG. 4 shows along its abscissa the distribution of light intensity $i$ longitudinally of the item to be photographed, in the longitudinal direction $y$, with the ordinate of FIG. 4 also being in the light intensity units J.

In the direction of the coordinate $x$ of FIG. 3, there is a light density profile $I_x$ in order to achieve a uniform negative density. This required profile of light in density is achieved from the intensity $I_1$ of the lower row of lamp means and the intensity distribution $I_2$ of the upper row of lamp means, these distributions of light intensity for the pair of rows of lamp means being added to each other to achieve the entire light distribution $I_x$ which is indicated in dotted lines in FIG. 3. The individual light distributions $I_1$ and $I_2$ are thus dependent upon the distances $r_a$ and $r_b$ (FIG. 1) of the lamp filaments from the intersections of the beam axis with the surface 1a, as well as from the cosine of the angle $\Phi_a$ and the cosine $\Phi_b$, these angles also being indicated in FIG. 1. Thus, one of the determining factors is the angular relationship between the surface which is illuminated and the light beam axes 11a and 11b. By adjusting the elevation of the sleeves 6 and 7 of the adjusting means and by tilting the plurality of lamp means 11 about the axes of the carriers 6a, 6b, and 7a, 7b, it is possible to adjust the distances $r_a$ and $r_b$ as well as to adjust the points of intersection of the light beam axes 11a and 11b and the surface 1a, which determines the locations of maximum light distribution $I_1$ and $I_2$, so that by carrying out these adjustments the curve $I_x$ which results from the adding of the curves $I_1$ and $I_2$ will correspond to the required curve $I_x$.

In the $y$ direction, shown in FIG. 4, a uniform negative density is achieved, if, as indicated in FIG. 4, the light distribution $I_y$ is obtained. This light density distribution is achieved by way of the intensities $I_{11}-I_{18}$ of the upper row of lamp means and the intensities $I_{21}-I_{28}$ of the lower row of lamp means, if the lateral distances between the several lamp means 11, axially of the carrier bars, are selected in such a way that the curve $I_y$ resulting from the addition of the light intensity curves $I_{11}-I_{18}$ and $I_{21}-I_{28}$, approaches the desired light distribution curve $I_y$. This latter result is achieved, as is apparent from FIG. 4, when the distances between the outermost plurality of lamp means is selected so as to be smaller than the distances between the inner, more centrally located plurality of lamp means.

Although the invention is illustrated and described with reference to one preferred embodiment thereof, it is to be expressly understood that it is in no way limited to the disclosure of such a preferred embodiment, but is capable of numerous modifications within the scope of the appended claims.

What I claim is:

1. In the device for making microfilm photographs, a support having a supporting surface for an item which is to be photographed, a camera stand for supporting a camera over said surface, and an illuminating assembly situated in its entirety to one side of said surface, said illuminating assembly including a lamp stand situated at said one side of said surface and said lamp stand having a pair of carriers, a row of lamp means mounted on each one of said pair of carriers for providing light beams, the intensity of which is greatly dependent upon the angle of emission of the beams, and adjusting means coacting with the rows of lamp means for adjusting them to locate the axes of the beams issuing from the lamp means of one row along that one end of an item to be photographed which is nearest to said one row and for adjusting the lamp means of the other row to locate the axes of the beams issuing therefrom along an opposed end of the item, said adjusting means coacting with said carriers for adjusting the elevation thereof, and also coacting with said rows of lamp means for adjusting the distance between the plurality of lamp means and the surface which supports the item which is photographed.

2. The combination of claim 1 and wherein said adjusting means coacts with the carriers for angularly and laterally adjusting the lamp means carried thereby.

3. The combination of claim 1 wherein said lamp stand and camera stand form a structural unit.

4. The combination of claim 2 and wherein said carriers include elongated bars of circular cross section, and said adjusting means including releasable clamps clamping the plurality of said lamp means to said bars for angular and longitudinal adjustment with respect thereto, said lamp stand including an upright of noncircular cross section and said adjusting means including sleeves shiftable along said upright with the latter passing through said sleeves, said sleeves forming part of said bars which form said carriers and said adjusting means including clamping elements for releasably clamping said sleeves and selected elevations along said upright.